Sept. 20, 1949.    C. HOLLERITH    2,482,732
ELECTROHYDRAULIC BRAKE

Filed Dec. 29, 1945    2 Sheets-Sheet 1

Inventor
CHARLES HOLLERITH
By Beaman & Langford
Attorneys

Sept. 20, 1949.  C. HOLLERITH  2,482,732
ELECTROHYDRAULIC BRAKE
Filed Dec. 29, 1945  2 Sheets-Sheet 2

Inventor
CHARLES HOLLERITH
By Beaman & Langford
Attorneys

Patented Sept. 20, 1949

2,482,732

UNITED STATES PATENT OFFICE 2,482,732

ELECTROHYDRAULIC BRAKE

Charles Hollerith, Jackson, Mich., assignor, by mesne assignments, to The B. F. Goodrich Company, Akron, Ohio, a corporation of New York Application December 29, 1945, Serial No. 638,313

5 Claims. (Cl. 188—152)

The present invention relates to hydraulic systems and more particularly to an electro-hydraulic system for actuating wheel brakes.

The invention is particularly applicable to airplane wheel brakes. In prior art airplane wheel brake systems the usual custom is to provide pressure accumulators for hydraulic fluid and long lines therefrom to the brakes. The long lines have the disadvantage of not only exposing long pressure lines to possible leakage but also result in a delay in the operation of the brake. Furthermore, long pressure lines will increase cost and weight of the installation.

The present invention eliminates the enumerated prior art difficulties in that it provides a compact unit which may be operated by remote control and located adjacent the wheel brakes to be operated. The unit, according to the present invention, is made compact by disposing a pressure-developing pump within the hydraulic fluid reservoir and mounting the controlling valve mechanism on the reservoir.

Accordingly, an object of the present invention is to provide an electro-hydraulic brake system as a compact unit.

Another object of the invention is to provide a hydraulic system of compact size which may be mounted adjacent the brake to be actuated.

Another object of the invention is to provide a compact hydraulic brake unit, adapted to be operated by remote control.

Still another object of the invention is to provide a hydraulic brake unit wherein there is a reservoir in which there is disposed a pressure-developing pump for forcing hydraulic fluid into the system and a differentially controlled by-pass valve for controlling the pressure applied to the brake.

A further object of the invention is to provide in a hydraulic system of the character described a so-called parking valve for trapping in the system, hydraulic fluid at full pressure, to maintain the brake applied.

Figure 1:
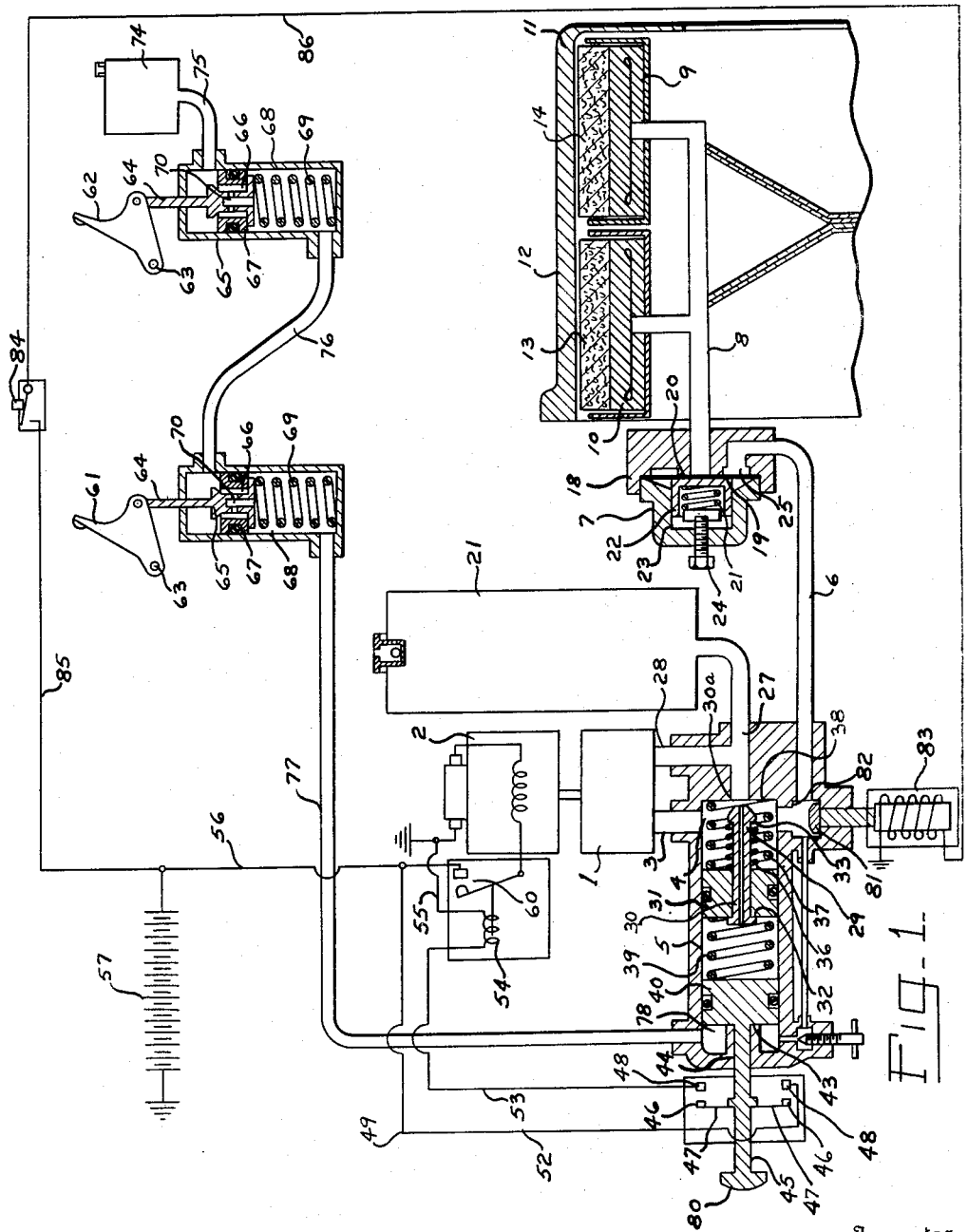
Figure 2:
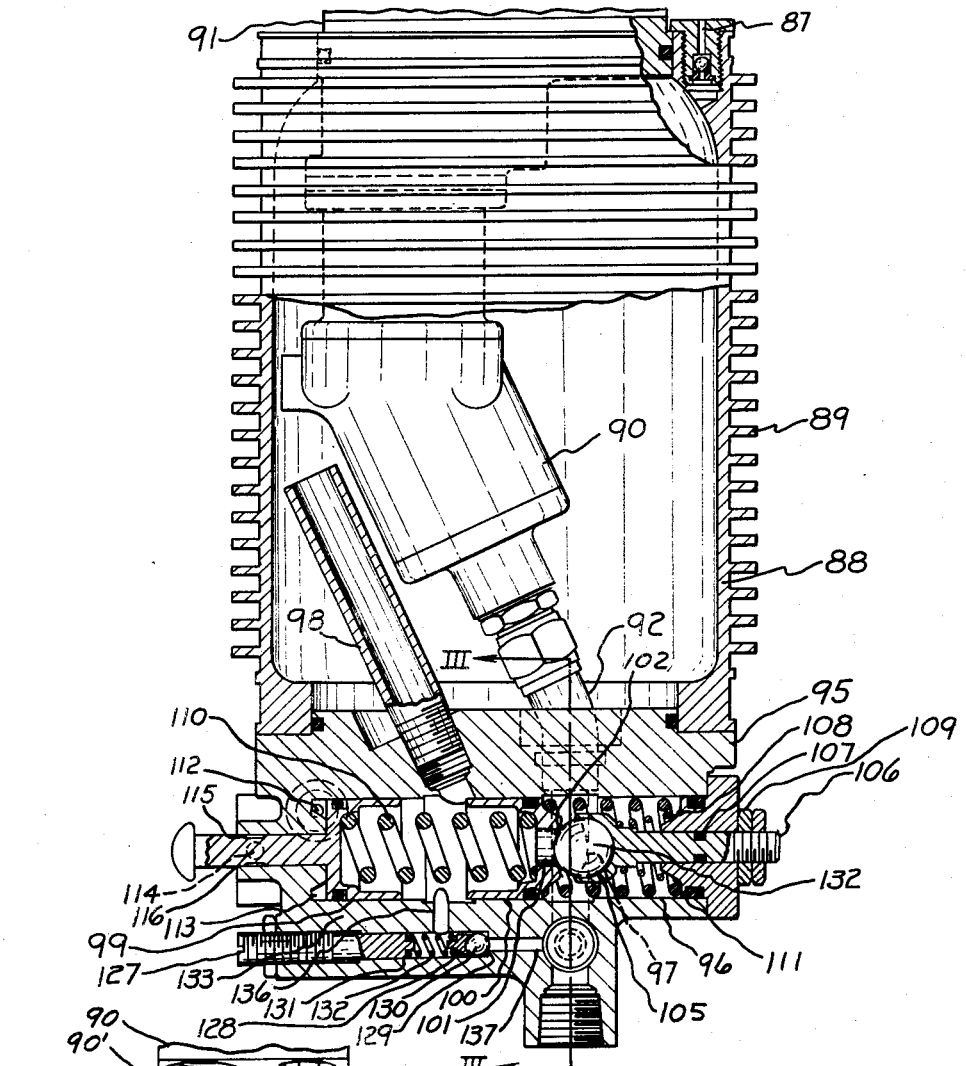
Figure 3:
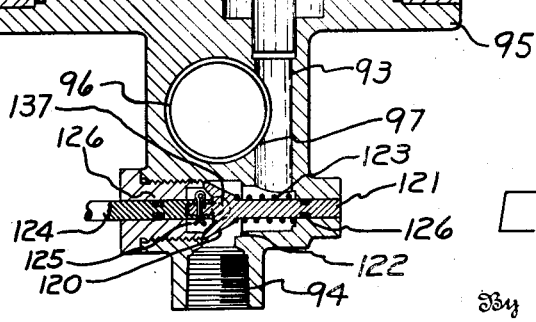

These and other objects residing in the arrangement, combination and construction of the parts will be apparent from the following specification and claims, when taken with the accompanying drawings, in which Fig. 1 is a diagrammatic illustration of a hydraulic system according to the present invention, Fig. 2 is a vertical section through a specific form reservoir and valve-controlling structure, and Fig. 3 is a section on the line III—III of Fig. 2.

Referring particularly to Fig. 1 of the drawings, the reference character 1 indicates a pump which is driven by a motor 2 and is arranged to force hydraulic fluid from the reservoir 21 under pressure through a conduit 3. The conduit 3 includes a portion 4 at the right-hand end of a cylinder 5 as viewed in Fig. 1 but also includes a tube 6 which delivers hydraulic fluid under pressure through a pressure regulator 7 and a distributing tube 8 communicating with expander tubes 9 and 10 of a brake generally indicated at 11, having a brake shoe 12 and brake blocks 13 and 14.

The brake 11 is actuated by hydraulic pressure fluid from the distributor 8 expanding the tubes 9 and 10 to force the brake blocks 13 and 14 outwardly into contact with the drum 12. Upon a decrease in the hydraulic fluid pressure, as when the brake control is released, the expander tubes 9 and 10 collapse and the brake blocks 13 and 14 retract from the drum 12 in a manner which is well known in the art. In order to provide the proper degree of clearance between the brake blocks 13 and 14 and the drum 12 and at the same time to retain a predetermined amount of hydraulic fluid in the distributor 8 and the expander tubes 9 and 10, there is provided the pressure regulating valve 7.

Pressure regulating valve 7 consists of a housing 18 in which is mounted a diaphragm 19. The diaphragm 19 is urged against a seat 20 by a spring 21 bearing against a piston 22 in a cylinder 23. The pressure exerted by the spring 21 is adjustable by means of a screw 24. The tube 6 terminates in a port 25 which is sealed off by diaphragm 19 when it is seated against the seat 20.

Upon release of the brake 11 by reducing the hydraulic fluid pressure as hereinafter described, hydraulic fluid in the distributor 8 will escape therefrom and from the expander tubes 9 and 10 until the diaphragm 19 under the action of the spring 20 closes the distributor 8 and the port 25. Thus the amount of pressure that is retained in the distributor 8 when the brake controls are released may be adjusted by means of the screw 24 controlling the tension on the spring 21.

The pump 1, if operating with the brake not applied, circulates hydraulic fluid through the portion 4 of the conduit 3, the conduit 27 and the port 28, back to the conduit 3, which passages constitute a by-pass of the hydraulic fluid from the normal channel for hydraulic fluid through the conduit 3 including the tube 6.

When it is desired to force hydraulic fluid under pressure into the tube 6 of the conduit 3 and to the distributor 8, a valve 29 is caused to seat against a seat 30 to close the by-pass established by the conduit 3, portion 4, conduit 27 and port 28. Hydraulic fluid is then drawn from the reservoir 21 through the conduit 27 and the port 28 to the pump 1.

The valve 29 consists of a tube 30 mounted for slidable movement in a piston 31. The range of movement of the tube 30 in the piston 31 is established by shoulders 32 and 33. The valve 29 is maintained in a projected position with respect to the piston 31 by a helical spring 36 about the portion of the tube 30 projecting outwardly from the piston 31. The normal unstressed position of the piston 31 is established by a helical spring 37 bearing against one end thereof and bearing at the other end against a shoulder 38 comprising one end of the cylinder 5. The position of the piston 31 is also established by a helical spring 39 bearing against the opposite end of the piston 31 and against a piston 40. Pistons 31 and 40 are both slidable in the cylinder 5 and are provided with suitable sealing rings for preventing the escape of hydraulic fluid therepast. The piston 40 in normal unstressed position is seated against a seat 43 at the left end of the cylinder 5 as viewed in Fig. 1 and has projecting outwardly therefrom, through a bore 44, a rod 45 having contacts 46, 46 on an arm 47, 47 adapted to engage with contacts 48, 48 when the piston 40 moves to the right to close a circuit for driving the motor 2 for operating the pump 1. The circuit 49 consists of conductors 52 and 53 having the contacts 48, a relay 54, a conductor 55 to ground and a conductor 56 through a battery 57 to the ground. The relay 54 closes a switch 60 which closes the motor 2 circuit which consists of ground, battery 57, conductor 56, the switch 60 and the motor 2 to ground.

Valve 33 is actuated by either of the foot pedals 61 or 62 which provide for dual control. The foot pedals 61 and 62 are both pivoted about pins 63 and have pivoted thereto rods 64. The rods 64 carry valves 65 arranged to close, upon lowering, ports 66 in pistons 67 in cylinders 68. Downward movement of the valves 65 and thus the pedals 61 and 62 is resisted by helical springs 69 in the cylinder 68 beneath the pistons 67. Ports 70 are provided in the structure of the valves 65 to permit the flow of hydraulic fluid from the portions of the cylinders 68 containing the springs 69 when pressure is removed from the pedals 61 and 62.

A supplementary hydraulic fluid reservoir 74 is provided having a conduit 75 communicating with the portion of the cylinder 68 of the pedal 62 above the piston 67 therein, for maintaining the pedal system filled with fluid. Pressure on the pedal 62 results in forcing hydraulic fluid from its cylinder 68 through a conduit 76 into the top of the other cylinder 68 from which it flows through the port 66 thereof and the lower portion of its cylinder 68 through a conduit 77 into the end 78 of the cylinder 5.

Hydraulic fluid in the end 78 of the cylinder 75 forces the piston 40 to the right as viewed in Fig. 1. This force is transmitted through the spring 39 to the piston 31. Resistance to movement to the right of the piston 31 is offered by the spring 37. Relative movement between the pistons 40 and 31 is permitted because of the port in the tube 30 permitting escape and return of fluid from between the pistons 40 and 31.

The spring 36 urges the valve 33 to the right to seat against the seat 30a to close the port 27, therefore preventing the by-passing of hydraulic fluid from the pump 1 through the port 28 back to the inlet of the pump 1. The result is that hydraulic fluid from the pump 1 through the conduit 3 is directed past the tube 30 through the tube 6 to the distributor 8 to actuate the brake 11. The closing of the contacts 46 and 48 should be timed to start the pump 1 prior to the closing of the valve 29 to permit the pump 1 to get up pressure first.

The hydraulic fluid in the conduit 3 when under pressure exerts a pressure against the piston 31 which force is transmitted through the spring 39 and the piston 40 back to the foot of the operator on pedal 61 or 62, depending upon which pedal is employed to initiate braking action. Thus, it will be apparent that if only a slight pressure is placed on either the brake pedal 61 or 62, the pressure of the fluid of the distributor 8 will be slight and a substantial part of the hydraulic fluid pumped will be by-passed through the conduit 27 and the port 28 to the intake of the pump 1. In order to increase the pressure of the fluid in distributor 8 it will be necessary to apply additional force to the brake pedal 61 or 62, depending on which one is being used to overcome the tendency of the pressure in the conduit 3 to move the piston 31 and thus the piston 40 to the left. In this manner there is imparted to the foot of the operator on the brake pedal 61 or 62 a "feel" which is indicative of the amount of pressure in distributor 8. In this way the operator may control, by the pressure of his foot, the amount of braking force applied to the brake.

In the event that it is desired to actuate the brake manually rather than by the remote hydraulic control provided by the pedals 61 and 62 and the conduits 77, there is provided a manual control 80 on the outer end of the rod 45. It will be thus obvious that by pushing the control 80 to the right as viewed in Fig. 1 the contacts 46 and 48 will be closed to actuate the motor 2 and the pump 1, and the pistons 40 and 31 will be moved to the right to close the valve 29. It is contemplated that, if desired, suitable mechanical linkage connections may be made to control 80 for actuating the same if it is not convenient to employ the short control adjacent the cylinder 5 as shown diagrammatically in Fig. 1.

Another feature of the invention is the so-called parking valve 81. Valve 81 is arranged in the conduit 3 and is adapted to seat against a seat 82 to close the conduit 3 to seal full pressure therein and in the distributor 8 to maintain the brakes applied for parking the vehicle, as for instance an airplane, with which the brakes are associated. The parking valve 81 is controlled by a solenoid 83 under the control of a switch 84. The circuit for the solenoid 83 and the switch 84 consists of ground through the battery 57, a conductor 85, switch 84, and a conductor 86 through the solenoid 83 to ground.

The structure disclosed hereinabove is considered to be a diagrammatic representation of the invention and of one form which the controlling valve may take. Another form of controlling valve which may be used in the system and which is considered to be diagrammatically represented by Fig. 1 is disclosed in Figs. 2 and 3.

In Figs. 2 and 3, the reservoir 88, provided with cooling fins 89, contains hydraulic fluid. In the reservoir 88 is arranged a pump 90 driven by a motor 91 partly broken away as shown in the drawing. The reservoir 88 is provided with filling and breathing device 87.

The pump 90 is provided with an inlet 90' as shown particularly in Fig. 3. The delivery side of the pump is connected to a conduit 92 which consists of a port 93, a connector 94 and appropriate tubing to the brake structure not shown but corresponding to the tubing 6 and distributor 8 of Fig. 1. The port 93 is in a block 95 secured to the reservoir 88 and is adjacent a cylinder 96 with which there is communication through a port 97.

There is provided a by-pass from the conduit 92, through the port 97, cylinder 96 and a conduit 98 to the reservoir 88, providing an endless circulation of brake fluid when the pump 90 is running and the brakes are not being operated.

There are disposed in the cylinder 96, pistons 99 and 100 corresponding respectively to the pistons 40 and 31 of Fig. 1. The piston 100 is provided with an opening 101 about which is a seat 102. The opening 101 comprises a part of the by-pass from the conduit 92 including the conduit 98, from the output side of the pump 90 to the reservoir 88.

The opening 101 is arranged to be closed under predetermined conditions of operation by a ball valve 105 fixedly carried on the end of a slidable rod 106. The rod 106 is provided with a suitable sealing ring 107 and is urged inwardly to move the ball 105 toward the seat 102 by the action of spring 108. Inward movement of the rod 106 is limited by nuts 109.

The pistons 99 and 100 are maintained in a predetermined normal position by a helical spring 110 disposed between them and a helical spring 111 disposed between piston 100 and the right end of the cylinder 96 as viewed in Fig. 1.

The by-pass is arranged to be closed by pressure fluid from the brake pedals 61 and 62 as disclosed in Fig. 1, forcing hydraulic fluid through the conduit 77 through a port 112 communicating with the space 113 between the left end of the cylinder 96 as viewed in Fig. 2, and the piston 99. The switch for starting the motor 91 to drive the pump 90 and corresponding to contacts 46 and 48 of Fig. 1, is controlled by a rod 114 disclosed in dotted outline in Fig. 2, which is moved axially by a camming surface 115 cut in a rod 116 extending axially from the piston 99.

When hydraulic fluid from some control means such as the pedals 61 and 62 of Fig. 1 is directed through the port 112 under pressure, it moves the piston 99 to the right as viewed in Fig. 2 and thus moves the spring 110 and the piston 100 to move the seat 102 against the ball 105 to close the by-pass valve. The by-pass valve consisting of seat 102 and the ball 105 is normally open sufficiently so that as the switch rod 114 is moved to closed position and the pistons 99 and 100 move to the right pump 90 will start and cause a circulation of hydraulic fluid through the conduit 92 and the port 97, the opening 101, the cylinder 96, and the conduit 98 into the reservoir 88 to build up working pressure in the outlet of the pump 90 before the seat 102 moves against the ball 105. Further movement of the piston 100 to the right causes the by-pass to be closed with the result that hydraulic fluid from the pump 90 is directed into the brake system through the outlet 94. It is to be understood that as pressure is developed in conduit 92, pressure is effective against the piston 100 and the ball 105 to move the same axially apart to permit by-passing a portion of the brake fluid. This force against the piston 100 is transmitted through the spring 110 and the piston 99, through the hydraulic fluid entering the port 112, back of the foot of the operator on the brake pedals 61 and 62 of Fig. 1. To increase the fluid pressure at the outlet 94, further pressure applied to the brake pedal 94, causes further force against the piston 99 to result in greater pressure against the by-passing valve. It will be understood that both the piston 100 and ball 105 are subjected to the pressure of the fluid in conduit 92, but that as the movement of the piston 100 to the right, as viewed in Fig. 2, is continued, the pressure which it is necessary to apply to the brake pedal will increase and the amount of hydraulic fluid by-passed will decrease. The result is that, as explained with respect to Fig. 1, the amount of braking action applied to the brake is varied according to the pressure on the brake pedal.

The structure in Figs. 2 and 3 is provided with a parking valve 120 corresponding to the parking valve 81 in Fig. 1. The parking valve 120 is mounted on an axially slidable rod 121 and is urged away from the seat 122, with which it is adapted to cooperate, by a helical spring 123. The parking valve 120 is in the conduit 92 between the by-pass valve and the pressure regulating valve 18 as disclosed in Fig. 1 and is adapted, as was the parking valve 81 of Fig. 1, to seal the braking fluid under pressure in the brake system to maintain the brake in "On" condition for parking purposes.

The parking valve 120 is actuated by a rod 124 which is in turn operated by a solenoid, not shown, corresponding to the solenoid 83 of Fig. 1. The rod 124 is pivoted by a pin 125 to the valve 120. Both the rods 121 and 124 are provided with suitable sealing rings 126 to prevent the escape of brake fluid.

There is disclosed in Fig. 2 a pressure releasing valve not disclosed in Fig. 1 but with which the structure of Fig. 1 may be provided if desired. The pressure releasing valve indicated generally at 127 consists of a ball 130 bearing against a seat 129. The ball 130 is urged against seat 129 by a plunger 128 slidable in a cylinder 131 and stressed by a spring 132. The tension of the spring 132 is adjustable by a screw 133. The pressure releasing valve is in a by-pass consisting of a port 136 providing communication between the cylinder 96 and the cylinder 131 and a port 137 providing communication between the cylinder 131 and the portion of the conduit 92 adjacent the parking brake valve 120.

The tension of the spring 132 is adjusted to permit the pressure fluid in the conduit 92 to by-pass to the cylinder 96, and thus through the conduit 98 into the reservoir 88, upon the pressure in the conduit 92 reaching a predetermined maximum value.

The valve and reservoir structure as disclosed in Figs. 2 and 3 is provided with suitable bleeder ports not shown for the purpose of venting air and permitting the filling of the system with hydraulic fluid. It will be noted that the system as disclosed in Figs. 2 and 3 comprises a compact unit which is susceptible of being mounted adjacent the brake to be actuated and is compact in every respect. By mounting the unit adjacent the brake to be actuated, long fluid lines are eliminated with the result that the danger of leakage and the lag in operation of the brake are minimized.

The invention as disclosed illustrates in detail one form of valve unit that may be employed. Another form is illustrated diagrammatically. It will be understood that the other specific forms which will be apparent to those skilled in the art may be used without departing from the spirit and scope of the invention. Accordingly, I do not wish to be limited except by the scope of the following claims.

Having thus described my invention, what I desire to secure by Letters Patent and claim is:

1. An electric-hydraulic brake system for the landing wheels of airplanes and the like comprising a hydraulic brake, a supply of brake fluid located directly adjacent said brake, an electric operated hydraulic pump, conduit structure hydraulically connecting said brake, pump and supply, remotely located manually actuated fluid displacement means, valve structure, a hydraulic connection between said means and said valve structure for actuating the latter hydraulically, a by-pass between said pump and said supply regulated by said valve structure to selectively direct hydraulic pressure into said brake, an electric circuit for selectively operating said pump including a switch, and means hydraulically actuated by said fluid displacement means for operating said switch.

2. An electric-hydraulic brake system for the landing wheels of airplanes and the like comprising a hydraulic brake, an electric driven pump, a fluid connection between said brake and the discharge of said pump, a hydraulic supply, a fluid connection between said brake and said supply, a by-pass connection between the inlet and discharge of said pump, valve mechanism for regulating said by-pass and the flow of fluid between said brake and said supply, means for operating said valve mechanism including means movable by fluid pressure and operatively associated with said valve mechanism, fluid displacement means, a hydraulic connection between said first and second means adapted to actuate said valve mechanism hydraulically to close said by-pass to direct fluid pressure into said brake, an electric circuit for said pump, and switch means in said circuit and operatively associated with said valve mechanism for hydraulic actuation therewith.

3. An electric-hydraulic brake assembly comprising an electric drive pump having an inlet and a discharge, a by-pass conduit between said inlet and discharge, a valve regulating said by-pass, a brake hydraulically connected to said discharge, means for hydraulically actuating said valve, an electric circuit for said pump, and a switch in said circuit operatively connected to said means.

4. As an article of manufacture, a unit for use in electric-hydraulic brake systems comprising a brake valve, a supply tank disposed at said brake, an electric pumping unit disposed in said tank having an inlet connection therewith, a discharge connection between said pump and said valve, a supply connection between said valve and said tank, a hydraulic actuator for said valve, and a switch mechanism associated with said valve for actuation by such actuator.

5. An electric-hydraulic brake system for landing wheels on aircraft comprising a brake, a pump, supply and brake valve unit located directly adjacent said brake and hydraulically connected thereto, and a remotely located manually controlled means hydraulically connected to said brake valve for actuating it, an electric circuit for said pump, and a switch in said circuit actuated in timed relation to the operation of said valve including a switch contact mounted on and movable with said valve.

CHARLES HOLLERITH.

REFERENCES CITED

The following references are of record in the file of this patent:

UNITED STATES PATENTS

| Number | Name | Date |
|---|---|---|
| 1,110,567 | McAulay | Sept. 15, 1914 |
| 1,486,553 | Muffly | Mar. 11, 1924 |
| 1,744,684 | Griffith | Jan. 21, 1930 |
| 2,078,479 | Briggs | Apr. 27, 1937 |
| 2,273,152 | Sonnlag | Feb. 17, 1942 |
| 2,280,291 | Jaseph | Apr. 21, 1942 |
| 2,283,271 | Loomis | May 19, 1942 |
| 2,374,909 | Williams | May 1, 1945 |